US012732412B2

(12) United States Patent
Ramadoss et al.

(10) Patent No.: US 12,732,412 B2
(45) Date of Patent: Sep. 8, 2026

(54) ARTIFICIAL INTELLIGENCE-BASED INCIDENT TICKET MANAGEMENT SYSTEMS

(71) Applicant: NTT DATA Services, LLC, Plano, TX (US)

(72) Inventors: Ramkumar Ramadoss, Trichy (IN); Tamil Selvan Soundarapandian, Chennai (IN); Ramprassath T C, Chennai (IN); Kunal Jauhari, Bhopal (IN); Yagneshwaran Balasubramanian, Chennai (IN); Shabi Christopher, Peterborough (GB); Rohit Puri, Plano, TX (US)

(73) Assignee: NTT Data Services, LLC, Plano, TX (US)

( * ) Notice: Subject to any disclaimer, the term of this patent is extended or adjusted under 35 U.S.C. 154(b) by 0 days.

(21) Appl. No.: 18/583,372

(22) Filed: Feb. 21, 2024

(65) Prior Publication Data

US 2025/0267081 A1 Aug. 21, 2025

(51) Int. Cl.
*H04L 41/0631* (2022.01)
*G06F 11/07* (2006.01)
*G06F 40/20* (2020.01)

(52) U.S. Cl.
CPC ...... *H04L 41/0631* (2013.01); *G06F 11/0793* (2013.01); *G06F 40/20* (2020.01); *H04L 41/064* (2013.01)

(58) Field of Classification Search
None
See application file for complete search history.

(56) References Cited

U.S. PATENT DOCUMENTS

| | | | | |
|---|---|---|---|---|
| 8,689,095 | B2 | 4/2014 | Parish et al. | |
| 9,582,408 | B1 | 2/2017 | Jayaraman et al. | |
| 9,959,160 | B2 * | 5/2018 | Birkler | G06F 11/0703 |
| 10,015,181 | B2 * | 7/2018 | Horesh | H04L 63/1416 |
| 10,061,758 | B2 | 8/2018 | Anstis et al. | |
| 10,438,212 | B1 | 10/2019 | Jilani et al. | |
| 10,560,309 | B1 * | 2/2020 | Chitalia | H04L 41/0631 |
| 10,742,484 | B1 | 8/2020 | Friedrichs et al. | |
| 10,977,293 | B2 | 4/2021 | Cai et al. | |

(Continued)

FOREIGN PATENT DOCUMENTS

| | | | | |
|---|---|---|---|---|
| CA | 3055823 A1 * | 2/2020 | | G06N 3/08 |
| CN | 107544814 A | 1/2018 | | |

(Continued)

OTHER PUBLICATIONS

Liu, Rong and Lee, Juhnyoung, "IT Incident Management by Analyzing Incident Relations," IBM Research, Hawthorne, NY, USA.

*Primary Examiner* — Sandarva Khanal
(74) *Attorney, Agent, or Firm* — Patterson + Sheridan, LLP

(57) ABSTRACT

In some embodiments, a method for incident ticket management includes receiving input data having information relating to one or more incidents, classifying each incident of the one or more incidents, escalating an incident of the one or more incidents based, at least in part, on at least one of the classification of each incident or a prioritization level associated with each incident and generating a resolution for the incident, the resolution including at least one of a solution to the incident or an assignment of the incident to a related team.

14 Claims, 2 Drawing Sheets

(56) References Cited

U.S. PATENT DOCUMENTS 11,368,358 B2 * 6/2022 Bahrami ............... G06F 18/285
11,463,457 B2 * 10/2022 Bazalgette ............. G06N 20/00
11,595,243 B1 * 2/2023 Schreiber ............ H04L 41/0816
11,741,405 B2 * 8/2023 Mujumdar ............. G06Q 10/20
705/7.14
11,966,820 B2 * 4/2024 Ghatage .............. G06F 11/3006
12,238,140 B2 * 2/2025 Bazalgette .............. G06F 21/57
12,277,137 B2 * 4/2025 Arora ................... G08B 29/185
2010/0299314 A1 * 11/2010 Sengupta ............... G06Q 99/00
707/E17.058
2015/0121136 A1 * 4/2015 Namkoong ......... G06F 11/0793
714/15
2015/0213358 A1 * 7/2015 Shelton ............... H04L 41/0636
706/47
2017/0102988 A1 * 4/2017 Purushothaman .. G06F 11/0709
2017/0140315 A1 * 5/2017 Cao .................. G06Q 10/06311
2017/0199795 A1 * 7/2017 Allen .................. G06F 11/0712
2017/0331705 A1 * 11/2017 Jiang ................... H04L 41/5096
2017/0374561 A1 * 12/2017 Zhang ................... H04W 24/08
2018/0032971 A1 * 2/2018 Karuppasamy ........ G06N 20/00
2018/0260760 A1 * 9/2018 Srivastava ............... G06N 5/04
2019/0026459 A1 * 1/2019 Harutyunyan ...... H04L 43/0817
2019/0095495 A1 * 3/2019 Venkata Naga Ravi ....................
G06F 16/24568
2019/0108470 A1 4/2019 Navendu et al.
2019/0340004 A1 * 11/2019 Garay ................... G06F 9/5027
2019/0347282 A1 * 11/2019 Cai ........................ G06N 5/022
2020/0167785 A1 * 5/2020 Kursun ................. H04L 43/045
2020/0210924 A1 7/2020 Ghosh et al.
2020/0293946 A1 * 9/2020 Sachan .................... G06N 5/04
2021/0111980 A1 * 4/2021 Gupta ................. H04L 43/0817
2023/0188409 A1 * 6/2023 Wang .................. G06F 11/0754
709/224
2024/0022485 A1 * 1/2024 Sasikumar .......... G06F 16/2365
2024/0370878 A1 * 11/2024 Lloyd ................... G06F 11/079

FOREIGN PATENT DOCUMENTS

CN 108153719 A 6/2018
CN 105824548 B 6/2019
CN 115080651 A 9/2022
IN 202241008610 A 3/2022
WO WO-2020092956 A1 * 5/2020 ......... G06F 3/04847
WO WO-2022214324 A1 * 10/2022 ......... H04L 41/0631

* cited by examiner

ARTIFICIAL INTELLIGENCE-BASED INCIDENT TICKET MANAGEMENT SYSTEMS

TECHNICAL FIELD

The present disclosure relates generally to incident ticket management and more particularly, but not by way of limitation, to artificial intelligence-based incident tickets management systems.

BACKGROUND

This section provides background information to facilitate a better understanding of the various aspects of the disclosure. It should be understood that the statements in this section of this document are to be read in this light, and not as admissions of prior art.

Companies may generate petabytes of application logs every day, and information technology (IT) support teams of these companies, on average, generally need to classify thousands of IT incidents. While there are IT incident handling systems available, there are limitations with these systems.

SUMMARY OF THE INVENTION

This summary is provided to introduce a selection of concepts that are further described below in the Detailed Description. This summary is not intended to identify key or essential features of the claimed subject matter, nor is it to be used as an aid in limiting the scope of the claimed subject matter.

In one or more embodiments, the present disclosure pertains to a method for incident ticket management. The method includes receiving input data having information relating to one or more incidents, classifying each incident of the one or more incidents, escalating an incident of the one or more incidents based, at least in part, on at least one of the classification of each incident or a prioritization level associated with each incident and generating a resolution for the incident, the resolution including at least one of a solution to the incident or an assignment of the incident to a related team.

In one or more embodiments, the present disclosure pertains to a system for incident ticket management. The system includes memory and at least one processor coupled to the memory and configured to implement a method. The method includes receiving input data having information relating to one or more incidents, classifying each incident of the one or more incidents, escalating an incident of the one or more incidents based, at least in part, on at least one of the classification of each incident or a prioritization level associated with each incident and generating a resolution for the incident, the resolution including at least one of a solution to the incident or an assignment of the incident to a related team.

In one or more embodiments, the present disclosure pertains to a computer-program product including a non-transitory computer-usable medium having computer-readable program code embodied therein. The computer-readable program code adapted to be executed to implement a method for incident ticket management. The method includes receiving input data having information relating to one or more incidents, classifying each incident of the one or more incidents, escalating an incident of the one or more incidents based, at least in part, on at least one of the classification of each incident or a prioritization level associated with each incident and generating a resolution for the incident, the resolution including at least one of a solution to the incident or an assignment of the incident to a related team.

BRIEF DESCRIPTION OF THE DRAWINGS

A more complete understanding of the subject matter of the present disclosure may be obtained by reference to the following Detailed Description when taken in conjunction with the accompanying Drawings wherein.

DETAILED DESCRIPTION

Figure 1:
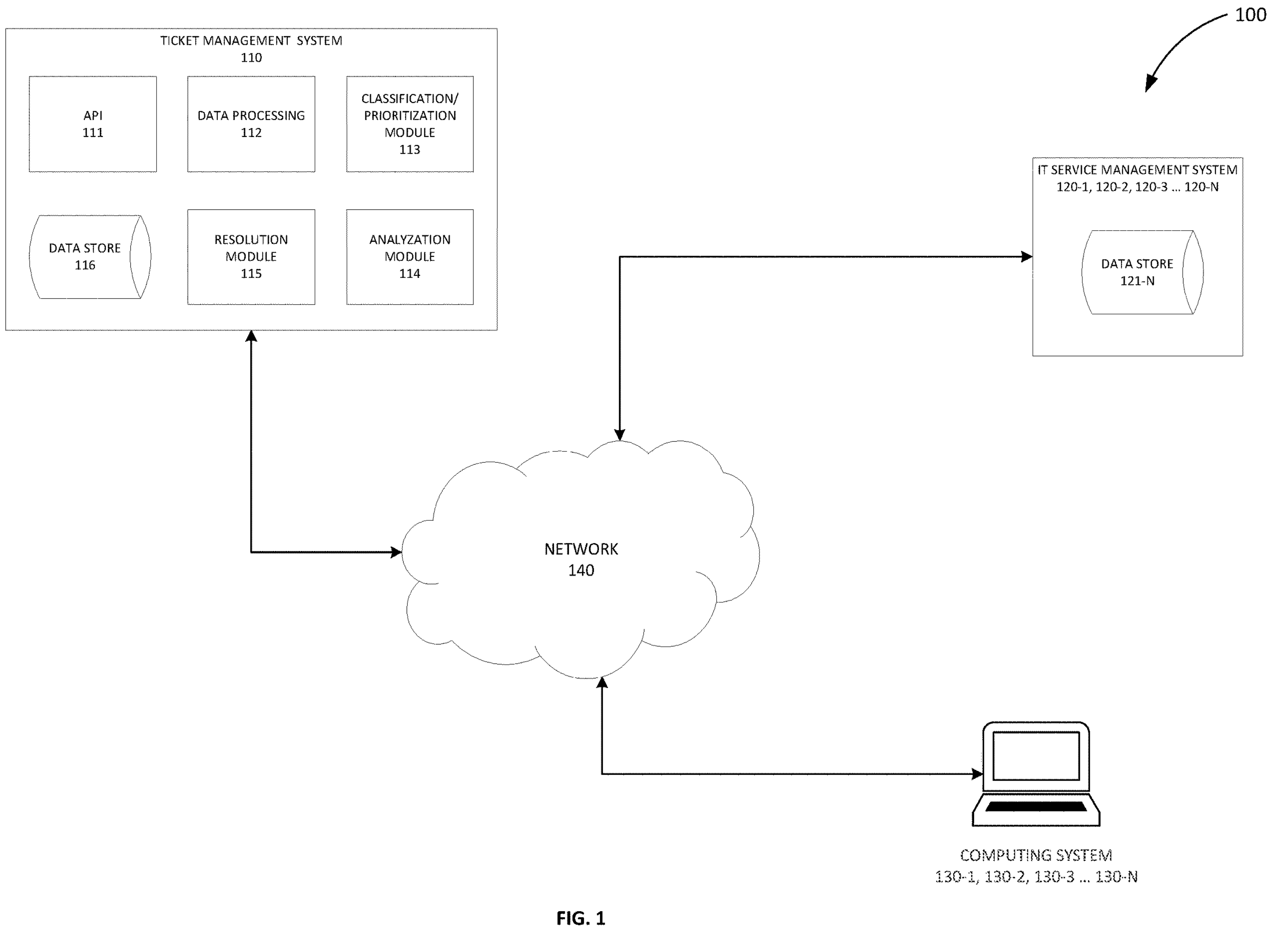
FIG. 1 illustrates an example artificial intelligence-based incident ticket management system according to certain embodiments of the disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. The section headings used herein are for organizational purposes and are not to be construed as limiting the subject matter described.

Advancements in information technology (IT) have enabled the digitalization of different processes and activities inside an industries or organizations. However, in order to reap the benefits of digitalization, IT infrastructures should run smoothly. As a result, businesses devote a substantial amount of time and resources on help desk support that caters to any user queries and/or incident tickets with respect to the IT infrastructures for employees and/or customers. In most cases, an incident ticket includes an issue that a user faces with hardware and/or software, as well as a request for information on hardware and/or software. A network failure and/or an asset that is not operating correctly might, for example, cause an incident. Examples of incidents include, without limitation, issues with Wi-Fi availability, printers, server crashes or misconfigurations of frameworks, application issues, email administration issues, personal computer crashes, client/employee confirmation mistakes, record sharing issues, and combinations of the same and like.

As a result, incidents may disrupt normal operations, thus reducing end-user productivity. With such a significant effect, businesses are upgrading incident response processes to ensure that incidents can be dealt with promptly and productively. In general, ticket management systems accept user queries and/or descriptions as input (e.g., incident tickets), categorize the tickets into different classes, prioritize the ticket based on urgency and/or overall impact, and route the tickets to an appropriate team for resolution. Generally, IT support teams co-ordinate with end users to resolve the incident tickets. IT service and/or support teams collaborate with the IT organization's ticket handling software systems to address support issues as quickly as possible, usually in compliance with service-level agreements (SLAs).

Generally, an organization may include various levels of IT support for various IT related incidents. For example and not by way of limitation, an organization may include five levels of support ranging from level 0 to level 4, where level 0 is generally the lowest level of support and level 4 is this highest level of support. Each level of support may have particular issues assigned to the level based, at least in part, on the type of issue that needs to be resolved. Generally, level 0 includes various knowledge-based portals, self-service portals to issue self-service requests (e.g., password resets), or any other various tools such that the end user may resolve in the incident themselves (e.g., software requests, log uploading, bug reporting, etc.). Level 1 IT support is generally the first level of person-to-person contact where end users and IT support becomes directly involved in the management and/or solution of the IT incident. This type of service may include, for example, software installation, trouble-shooting, incident management, and combinations of the same and like.

Level 2 support may generally include IT incidents that are slightly more complex than those addressed at level 1. These incidents may include, for example, IT incidents that could not be resolved at level 1. Additionally, level 2 IT personnel may provide documentation for end users and/or other support levels, document troubleshooting methods and/or resolutions, and combinations of the same and like.

Level 3 support may generally include the last level of IT support provided directly by an organization. Level 3 support personnel usually has integral knowledge of various software applications, frameworks, and hardware/software systems of the organization.

In some instances, level 3 support may have security permissions to directly access, maintain, or fix elements within the aforementioned. In various instances, level 3 support personnel may generate documentation to assist other levels of support and/or end users with more technical issues. In some circumstances, level 3 support may include management of network hotfixes, source code, new software, and the like.

In general, level 4 may be considered the highest level of support and is generally conducted via personnel within the organization and third-parties outside the organization that provide software and/or hardware to the organization. For example, level 4 support may include third-party vendors that provide the organization with outsourced software and/or hardware.

IT service management (ITSM), in general, is how IT teams manage end-to-end delivery of IT services to users. This includes, for example, the processes and activities to design, create, deliver, and support IT services. ITSM teams oversee various kinds of workplace technology, ranging from personal computers to servers, up to business-critical software applications. While current ITSM systems exist, there are limitations with these systems. For example, current systems still do not have the capacity to handle large amounts of support tickets on a daily basis. Support teams are compelled to single out certain enquiries and, possibly, ignore more complex issues. In addition, support teams struggle to give the right solution for more complex queries, which may delay the resolution of incident tickets. Furthermore, IT support staff may even lose the incident tickets when they are passed from one agent to the next.

This conventional method of responding to incidents is no longer adequate in today's increasingly fast-paced business environments. To handle an incident to the best of an organization's ability, complex and/or unpredictable processes should be managed in a smarter, more organized manner. To manage an incident properly, a unified platform that orchestrates each stage in the incident management process, including escalation protocols, can ensure that a company remains ahead of the incidents and may prevent the same problems from reoccurring, which can be advantageous when seeking to comply with SLAs relating to provided services.

Generally, service providers are required to maintain an SLA that defines the level of service expected by a customer from a supplier, laying out the metrics by which that service is measured, and the remedies or penalties, if any, should the agreed-on service levels not be achieved. Usually, SLAs are between companies and external suppliers, but they may also be between two departments within a company. The SLA may include not only a description of the services to be provided and their expected service levels, but also metrics by which the services are measured, the duties and responsibilities of each party, the remedies or penalties for breaches, and a protocol for adding and removing metrics.

SLAs may include, for example, service availability (e.g., the amount of time the service is available for use), defect rates (e.g., counts or percentages of errors in major deliverables), technical quality (e.g., in outsourced application development, measurement of technical quality by commercial analysis tools that examine factors such as source defects), security (e.g., measuring controllable security measures such as anti-virus updates and patching), business results (e.g., incorporate business process metrics into SLAs using existing key performance indicators, such as time to resolve open incidents), and combinations of the same and like.

In view of the above, artificial intelligence based incident tickets management systems are disclosed herein. Unlike other approaches, intelligent incident tickets management platforms, such as those disclosed herein, may automatically identify emerging issues, merge correlated issues, and recommend systemic resolution plans. With integrating business rules, incident logs, and issue emergence patterns, the platforms disclosed herein may automatically classify, prioritize, and recommend resolution depending on incident descriptions and/or keywords in an incident request. In addition, the systems and methods disclosed herein may also generate automated alerts for proactive outage prevention. By implementing the systems and methods of the disclosure, IT support teams are supported in many aspects by being provided detailed insight for root-cause analysis, resolution categorization, time service analysis, increased system availability, automated alerts to support team, focused IT support analysis, reduced turnaround for support tickets, and effective SLA management.

As such, the present disclosure overcomes the aforesaid drawbacks of current systems by providing an artificial intelligence based incident ticket management system that may efficiently classify, prioritize, and resolve the incidents. For instance, the incident ticket management systems according to the disclosure may classify the incidents based on, for example, natural language processing, prioritize the incident based on, for example, sentiment analysis, and cluster incidents based on various attributes such as, without limitation, ageing, product, resolution, and combinations of the same and like.

Additionally, when incident tickets are migrated from one incident management tool to another incident management tool, mapping the fields of source tools with destination tools may become an issue resulting in difficulty in incident assignment. The status of the tickets may be analyzed using, for example, work notes of every ticket in order to determine and resolve the incident tickets. Using the systems and methods disclosed herein, tickets may be classified based on the work notes, and the workflow may then be identified using automated business process discovery tools. In certain embodiments, tickets may be classified by analyzing the tickets using natural language processing by performing intent and entity identification. In some embodiments, completion status of ticket classification may be updated with the stages of pending tasks. Thus, the time spent by analysts on understanding the status of each ticket is saved by using the systems and methods disclosed herein, thus ensuring quick resolution of the tickets with reduced turn-around time to the business and with optimized incident tracking capability.

As discussed in further detail below, in some embodiments, the present disclosure relates to an artificial intelligence based incident ticket management system to analyze and resolve incidents efficiently. In general, incidents may be include IT incidents that may, for example, be managed by a dedicative team of an ITSM. The present disclosure, in various embodiments as outlined below, assists the ITSM team by instantly identifying and resolving incidents. In certain embodiments, the present disclosure relates to an artificial intelligence based incident ticket management system which may integrate learned business rules, incident logs, and issue emergence patterns. In some embodiments, the ticket management system may provide solutions to manage the incident tickets based on classification, prioritization, and/or resolution.

FIG. 1 illustrates an example artificial intelligence based incident ticket management system 100 according to certain embodiments of the disclosure. In general, the system 100 may include, for example and not by way of limitation, a ticket management system 110, ITSM systems 120-1, 120-2, 120-3 . . . 120-N (collectively referred to as ITSM system 120) each having a data store 121-N (collectively referred to as data store 121), and computing systems 130-1, 130-2, 130-3 . . . 130-N (collectively referred to as computing system 130) each communicatively coupled via a network 140 (e.g., the Internet, a public cloud system, a private cloud system, and the like). In certain embodiments, each of the ticket management system 110 and/or the ITSM system 120 may include a computer system 200 as described further in FIG. 2. Furthermore, in certain embodiments, computing system 130 may be representative of computer system 200 as described in further detain in FIG. 2.

As shown in FIG. 1, the ticket management system 110 may include an application programming interface a (API) 111, a data processing module 112, classification/prioritization module 113, an analyzation module 114, a resolution module 115, and data store 116. In certain embodiments, the data store 116 may be representative of storage 206 as described in FIG. 2. While the ticket management system 110 is described as a single ticket management system 110, in various embodiments, the ticket management system 110 may include a plurality of ticket management systems 110. For example, the system 100 may include a ticket management system 110 for each tenant on the network 140 (e.g., a private and/or public cloud system) or within an organization operating on the network 140. In such embodiments, each ticket management system 110 can interact with corresponding ITSM systems 120 and computing systems 130 over the network 140. In various embodiments, when system 100 includes a plurality of ticket management systems 110, the network 140 may be a plurality of private and/or public cloud systems for each tenant.

In various embodiments, the ticket management system 110 (e.g., the data processing module 112) may access input data from the ITSM system 120 from data store 121 of, for example, an organization, via the API 111. In some embodiments, the data processing module 112 retrieves the input data from the ITSM system 120 responsive to a user request initiated from, for example, the computing system 130. In some embodiments, the ITSM system 120 periodically sends the input data to the ticket management system 110 (e.g., every 5, 10, 15, 20, 30, 45, or 60 minutes). In certain embodiments, the ticket management system 110 periodically requests input data from the ITSM system 120 (e.g., every 5, 10, 15, 20, 30, 45, or 60 minutes). In various embodiments, the ticket management system 110 and the ITSM system 120 exchange (i.e., sends and/or receives) the input data in real-time. In certain embodiments, the data processing module 112 may include a log-miner. In some embodiments, the log-miner captures, indexes, and/or correlates real-time data (e.g., from data store 121) in a searchable repository. In certain embodiments, the searchable repository includes, without limitation, input data relating to IT incidents.

In various embodiments, the input data may be structured or unstructured data and/or come in various formats (e.g., text, images, video, and/or audio). In certain embodiments, the input data may be received in text format, and include information related to IT incidents. In certain embodiments, the input data may include one or more IT support tickets, including, but not limited to, service requests, incident tickets, problem tickets, change request tickets, and combinations of the same and like. In some embodiments, the service requests may include, without limitation, a request for a product/service, new hardware and/or software, access to tools, password resets, software licenses, and combinations of the same and like. In various embodiments, the incident tickets may include, without limitation, requests to restore operational efficiency and/or productivity during unplanned interruptions or reduction in the service quality of IT products. In some embodiments, the problem tickets may include, without limitation, requests to determine root-causes behind incidents that affect multiple users simultaneously. In certain embodiments, the change request tickets may include, without limitation, a request to change, modify, and/or replace hardware, software, or services.

Additionally and/or alternatively, in certain embodiments, the IT support tickets may include, for example and not by way of limitation, requests for service (e.g., hardware and/or software), requests for technical support relating to one or more IT devices and/or services, update requests, security requests, new service requests, trouble-shooting assistance requests, and/or combinations of the same and like. In various embodiments, the input data includes historical data based, at least in part, on prior incidents. In certain embodiments, the prior incidents are one or more IT support tickets, including, but not limited to, service requests, incident tickets, problem tickets, change request tickets, and/or combinations of the same and like.

In some embodiments, the input data may be stored in data store 116 after the input data is received. In certain embodiments, after the input data is stored in data store 121, the data processing module 112 may perform various types of data preprocessing on the input data. For example, in some embodiments, the data processing module 112 may clean, filter, and/or transforming the input data to make it suitable for further analysis. In certain embodiments, this may include, without limitation, removing missing values, scaling or normalizing the input data, or converting the input data to a different format. In certain embodiments, the data processing module 112 may utilize natural language processing technology to remove uninformative words. For example, the data processing module 112 may pull input data from the data store 121 and analyze the input data such that the uninformative words are removed from the input data (e.g., one or more incidents). In some embodiments, the data processing module 112 may remove uninformative words, such as, for example, stop-words. In certain embodiments, the stop-words may include, without limitation, "the", "a", "each", "such", "about", "to", and combinations of the same like. In some embodiments, the stop-words may be any word, in any language, which does not add meaning to a sentence, and as such, these words may be safely ignored without sacrificing the overall meaning of the input data.

In certain embodiments, the ticket management system 110 (e.g., the classification/prioritization module 113) may categorize/prioritize the input data (e.g., one or more incidents, such as IT tickets). In various embodiments, the classification/prioritization module 113 may classify incident tickets based on, for example, product, product-type, location, client, and the like. In certain embodiments, the input data is categorized using an artificial intelligence ticket categorization model. In some embodiments, the categorization may include, without limitation, grouping similar incidents and identifying products which are impacted by the incidents. In some embodiments, the categorization may also be referred to as classification. In some embodiments, the impacted products may include, for example, business software applications, hardware, operational services, networks, network services, and combinations of the same and like. In some embodiments, the input data is categorized based on a business area.

Additionally and/or alternatively, in certain embodiments, an artificial intelligence model categorizes the input data using the artificial intelligence ticket categorization model which may include, for example, categorizing the input data by utilizing historical data associated with IT incidents. In such embodiments, the input data is pre-processed by removing stop-words and uninformative words. In some embodiments, the artificial intelligence ticket categorization model further performs pattern discovery using machine learning algorithms. For example, in some embodiments, the pattern discovery process includes vectorization of words from the input text data using natural language processing. In certain embodiments, patterns are identified from the vectorized words and may be classified using supervised learning algorithm, such as, but not limited to, classification algorithms. In some aspects, the classified patterns may be analyzed by ranking the features of the patterns and reducing the number of factors available in the patterns based, at least in part, on the reduced set of factor anomalies in the patterns that are detected and removed.

In certain embodiments, the classification/prioritization module 113 may prioritize the input data (e.g., incident tickets). In some embodiments, the prioritization may occur before, during, or after the input data is classified and/or categorized. In certain embodiments, the prioritization may include prioritizing incident tickets in a queue based on, for example and not by way of limitation, ageing, client requirements, issue type, severity, sentiment, preset rules, and combinations of the same and like. In certain embodiments, incident tickets may be prioritized based on the impact and urgency of the incidents. In various embodiments, the prioritization of incidents includes, without limitation, escalating incidents with high priority and/or incidents which are not resolved by peers.

In certain embodiments, the input data (e.g., incident tickets) can by analyzed by the ticket management system 110 (e.g. the analyzation module 114). For example, in some embodiments, sentiments (e.g., emotional sentiment) of the incident tickets may be analyzed by the analyzation module 114 by utilizing, for example, text portions of the input data. In certain embodiments, analyzing the sentiments includes, without limitation, identifying emotions, keywords, and/or opinions in the input data.

In certain embodiments, the analyzation module 114, may perform correlation analysis of the incident tickets. In some embodiments, the correlation analysis may be performed in real-time. In some embodiments, the analyzation module 114 may correlate the incident tickets in order to identify patterns in multiple incident tickets. For example, the analyzation module 114 may identify an issue source, an incident type, time-based correlations of incidents, and combinations of the same and like based, at least in part, on the correlation.

In certain embodiments, for example, when a log-miner is utilized by the ticket management system 110 (e.g., via the data processing module), the analyzation module 114 may identify patterns using, for example, application and/or system logs. In various embodiments, the log-miner may include an artificial intelligence log-miner. In some embodiments, the analyzation module 114 may monitor logs (e.g., via the log-miner) to monitor root-causes of incident by identifying issue patterns based on issue sources, incident types, real-time correlation of issues, and combinations of the same and like.

In various embodiments, the analyzation module 114 may monitor logs for incident occurrence and specify the underlying issues to the user and/or IT support team member. In such embodiments, the analyzation module 114 may identify root-causes of larger issues that may be instantly identified. As such, time spent on a root-cause analysis is greatly reduced. In some embodiments, the analyzation module 114 may predict future issues such that automatic resolutions may be identified. In certain embodiments, the analyzation module 114 may generate rules corresponding to incidents. For example, the analyzation module 114 may generate rules that include, without limitation, ticket routing information (e.g., routing the incident to level 2 support) based, at least in part, on the input data.

Additionally and/or alternatively, in certain embodiments, the analyzation module 114 may perform, in real-time and/or periodically, correlation analysis to identify patterns in an issue source, an incident type, and time-based correlations. In certain embodiments, the analyzation module 114 may use a correlation-based artificial intelligence model. In some embodiments, the correlation-based artificial intelligence model analyses, for example, petabytes of data from incident history data. In various embodiments, the analyzation module 114 sets up asset relationships based on, for example but not limited to, the incident history data. In certain embodiments, based on the correlation-based artificial intelligence model, rules are setup in accordance with similar incidents. In various embodiments, an alert may be sent to related teams to resolve the incident when a related pattern occurs. In some embodiments, whenever new patterns occur, based root-cause analysis, the patterns may be calibrated with existing patterns by the analyzation module 114.

In certain embodiments, the ticket management system 110 (e.g., the resolution module 115) may provide resolutions to the incident ticket. For example, in some embodiments, a resolution may be provided to the incidents based on priority. In some embodiments, the resolution module 115 may provide a resolution to the incident by creating a work plan and/or assigning the incident to a relevant IT team. In some embodiments, the work plan includes, without limitation, incident ticket resolution goals, a list of deliverables required to meet incident ticket resolution goals, and a schedule and/or timeline for completing the work plan. Additionally and/or alternatively, in certain embodiments, the work plan may include supporting documentation, such as, for example personnel and resource requirements, a work plan communications strategy, and a risk identification and/or management plan.

In some embodiments, the resolution may include mapping an optimal path to a resolution. In various embodiments, the optimal path to the resolution is generated using a business process miner. In some embodiments, the optimal path to the resolution is generated for specific incident types. In certain embodiments, the optimal path to the resolution may include, for example, a path of support. In some embodiments, the path of support defines, for example, the level of support and/or support paths related to the resolution to the ticket. For example, the optimal path to the resolution may include bypassing level 1 support and being diverted directly to level 3 support. In this manner, the optimal path can route the ticket to the appropriate level of support by bypassing support levels known to be unable to resolve the incident.

In certain embodiments, the resolution to the incident may include providing automated recommendations to resolve the incident. For example, in some embodiments, the automated resolution recommendation may include one or more resolutions based on, for example, receiving input data having information about an incident ticket. In some embodiments, one or more recommendations are automatically generated based on the incident ticket. In various embodiments, the recommendations may include resolutions related to the input data. In certain embodiments, one of the recommendations may be selected by a user and the incident may be assigned to a relevant team with the selected recommendation to resolve the incident. In certain embodiments, the automatic resolution may include resolution data related to a previous incident sharing similar data relating to the incident. In some embodiments, the automatic resolution may include a resolution related to a known root-cause of the incident.

As shown in FIG. 1, the system 100 may include one or more ITSM systems 120 each having data store 121. In some embodiments, the data store 121 may be representative of storage 206 as described in FIG. 2. In certain embodiments, the ITSM system 120 may help eliminate service silos by unifying various service management practices within one platform. In some embodiments, a centralized service portal (e.g., a frontend for the ITSM system 120) may serve as a single point of contact for users to report IT incidents and make service requests. In some embodiments, the ITSM system 120 may allow user queries from multiple sources (e.g., the computing system 130) into a single interface or shared repository, for example, on the data store 121, allowing support agents to collaborate and resolve incident tickets effectively. In various embodiments, the ITSM system 120 may systematically, and accurately capture user support requests from various sources, such as phone calls, website interfaces, emails, online chat systems, online automatic-response chat systems, and/or combinations of the same and like. Once incident ticket details are captured (e.g. via input data provided by a user), the ITSM system 120 may be integrated with the ticket management system 110 (e.g., via the API 111) to process, categorize, prioritize, and/or provide resolutions to the incident tickets based on, for example, the urgency or pre-set routing rules, directing the incident tickets to an appropriate support team. In certain embodiments, the ITSM system 120 may provide real-time data to the ticket management system 110.

Additionally, the system 100, as shown in FIG. 1, may include one or more computing systems 130. In certain embodiments, computing system 130 may be representative of computer system 200 as described in further detain in FIG. 2. In various embodiments, the computing system 130 may communicate with one or more of the ticket management system 110 and/or the ITSM system 120. The computing system 130, in certain embodiments, may be used to initiate procedures, such as those discussed below relative to FIG. 2 by creating an incident ticket. In various embodiments, the computing system 130 may be used for creating, modifying, or closing incidents stored on the ITSM system 120 and/or the ticket management system 110. In some embodiments, the computing system 130 may access an interface of the ticket management system 110 and/or the ITSM system 120. In some embodiments, the interface of the ticket management system 110 and/or the ITSM system 120 may include, without limitation, a graphical user interface (GUI) operable to access the ticket management system 110 and/or the ITSM system 120, a frontend the ticket management system 110 and/or the ITSM system 120 (e.g., a website frontend), a computer program operable to interact with the ticket management system 110 and/or the ITSM system 120, and combinations of the same and like.

It should be noted that while each module of the ticket management system 110 may be operated independently, each module within the ticket management system 110 may work in parallel or in tandem with other modules within the ticket management system 110. As such, each module within the ticket management system 110 can independently, or in combination, perform similar and/or related tasks, and are described as separate modules for illustrative purposes only. Additionally, while the ticket management system 110 is described relative to FIG. 1 as including the API 111, the data processing module 112, the classification/prioritization module 113, the analyzation module 114, and the resolution module 115, in certain embodiments, the above described modules may be expanded into more modules, or reduced into fewer modules. In such embodiments, each module of the ticket management system 110 may be expanded into multiple modules or confined to fewer modules without deviating from the scope of the disclosure. Additionally, while FIG. 1 is described relative to a single ticket management system 110, the ticket management system 110 may be expanded into multiple ticket management systems 110 and/or a plurality of ticket management systems 110 without deviating from the scope of the disclosure.

Figure 2:
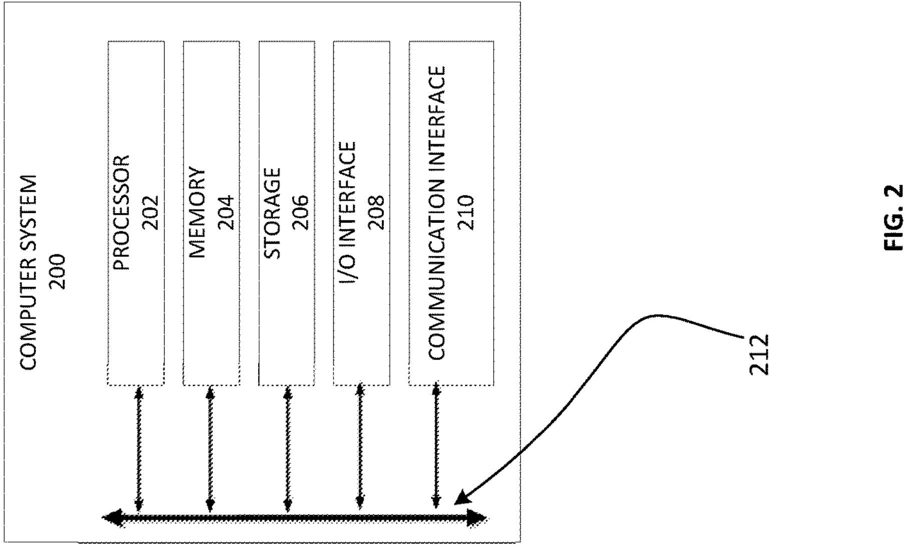
FIG. 2 illustrates an example computer system according to certain embodiments of the disclosure.

FIG. 2 illustrates an example computer system 200. Computer system 200 may include a processor 202, memory 204, storage 206, an input/output (I/O) interface 208, a communication interface 210, and a bus 212. Although this disclosure describes one example computer system including specified components in a particular arrangement, this disclosure contemplates any suitable computer system with any suitable number of any suitable components in any suitable arrangement. As an example and not by way of limitation, computer system 200 may be an embedded computer system, a system-on-chip, a single-board computer system, a desktop computer system, a laptop or notebook computer system, a mainframe, a mesh of computer systems, a mobile telephone, a personal digital assistant, a server computing system, a tablet computer system, or a combination of two or more of these. Where appropriate, computer system 200 may include one or more computer systems 200; be unitary or distributed, span multiple locations, machines, or data centers; or reside in a cloud, which may include one or more cloud components in one or more networks. Where appropriate, computer system 200 may perform, at different times or at different locations, in real time or in batch mode, one or more steps of one or more methods described or illustrated herein.

Processor 202 may include hardware for executing instructions, such as instructions in or including a computer program. As an example and not by way of limitation, to execute instructions, processor 202 may retrieve (or fetch) the instructions from an internal register, an internal cache, memory 204, or storage 206; decode and execute them; and then write one or more results to an internal register, an internal cache, memory 204, or storage 206. Processor 202 may include one or more internal caches for data, instructions, or addresses.

In particular embodiments, memory 204 includes main memory for storing instructions for processor 202 to execute or data for processor 202 to operate on. In particular embodiments, one or more memory management units (MMUs) reside between processor 202 and memory 204 and facilitate accesses to memory 204 requested by processor 202. In particular embodiments, memory 204 includes random access memory (RAM). This disclosure contemplates any suitable RAM.

In particular embodiments, storage 206 includes mass storage for data or instructions. As an example and not by way of limitation, storage 206 may include a removable disk drive, flash memory, an optical disc, a magneto-optical disc, magnetic tape, or a Universal Serial Bus (USB) drive or two or more of these. Storage 206 may include removable or fixed media and may be internal or external to computer system 200. Storage 206 may include any suitable form of non-volatile, solid-state memory or read-only memory (ROM).

In particular embodiments, I/O interface 208 includes hardware, software, or both, providing one or more interfaces for communication between computer system 200 and one or more input and/or output (I/O) devices. Computer system 200 may be communicably connected to one or more I/O devices. An input device may include any suitable device for converting volitional user input into digital signals that may be processed by computer system 200, such as, by way of example and not limitation, a touch screen, a microphone, a joystick, a scroll wheel, a button, a toggle, a switch, a keyboard, a mouse, a touchpad, or a dial. An input device may include one or more sensors for capturing different types of information. An output device may include devices designed to receive digital signals from computer system 200 and convert them to an output format, such as, by way of example and not limitation, speakers, headphones, a display screen, a monitor, a heads-up display, another suitable output device, or a combination thereof. This disclosure contemplates any suitable I/O devices and any suitable I/O interfaces 208 for them. I/O interface 208 may include one or more I/O interfaces 208, where appropriate.

In particular embodiments, communication interface 210 includes hardware, software, or both, providing one or more interfaces for data communication between computer system 200 and one or more other computer systems 200 or one or more networks. Communication interface 210 may include one or more interfaces to a controller area network (CAN) or to a local interconnect network (LIN). Communication interface 210 may include one or more of a serial peripheral interface (SPI) or an isolated serial peripheral interface (isoSPI). In some embodiments, communication interface 210 may include a network interface controller (NIC) or network adapter for communicating with an Ethernet or other wire-based network or a wireless NIC (WNIC) or wireless adapter for communicating with a wireless network, such as a WI-FI network or a cellular network.

In particular embodiments, bus 212 includes hardware, software, or both, coupling components of computer system 200 to each other. Bus 212 may include any suitable bus, as well as one or more buses 212, where appropriate. Although this disclosure describes a particular bus, any suitable bus or interconnect is contemplated.

Herein, a computer-readable non-transitory storage medium or media may include one or more semiconductor-based or other integrated circuits (ICs) (such, as for example, field-programmable gate arrays or application-specific ICs), hard disk drives, hybrid hard drives, optical discs, optical disc drives, magneto-optical discs, magneto-optical drives, solid-state drives, RAM drives, any other suitable computer-readable non-transitory storage media, or any suitable combination. A computer-readable non-transitory storage medium may be volatile, non-volatile, or a combination of volatile and non-volatile, where appropriate.

Figure 3:
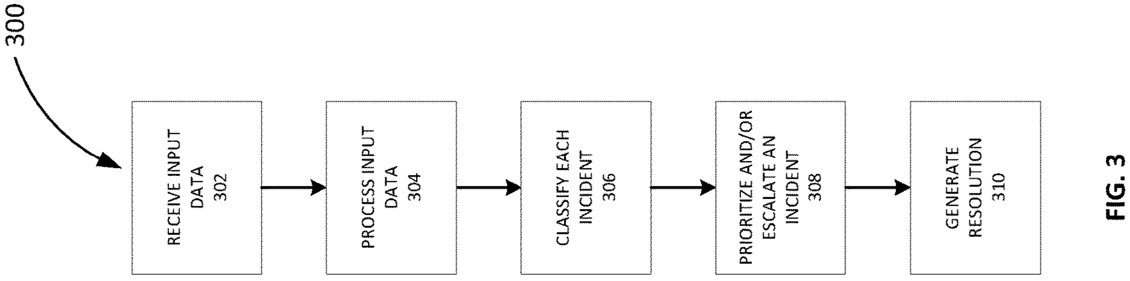
FIG. 3 illustrates an example method for incident ticket management according to certain aspects of the disclosure.

FIG. 3 illustrates an example method 300 for incident ticket management according to certain aspects of the disclosure. In certain embodiments, the method 300 is performed by one or more modules within the ticket management system 110.

At step 302, the ticket management system 110 (e.g., the data processing module 112) receives input data, as described above with respect to FIG. 1. In various embodiments, the input data includes information relating to one or more incidents. In certain embodiments, the input data includes an incident ticket and/or one or more incident tickets (e.g., related to IT incidents) and information corresponding to the incident. In some embodiments, the input data is received from an ITSM system of an organization (e.g., ITSM system 120). In some embodiments, the data processing module 112 receives the input data from the ITSM system 120 responsive to a user request initiated from, for example, the computing system 130. In some embodiments, the input data includes a plurality of input data. In some embodiments, the plurality of input data is one or more incident tickets and/or a plurality of incident tickets. In certain embodiments, the input data is received from a user (e.g., using computing system 130) submitting a request for IT service and/or support. In certain embodiments, the input data is stored within data store 116 after the input data is received by the data processing module 112.

At step 304, the ticket management system 110 (e.g., the data processing module 112) processes the input data, as described above with respect to FIG. 1. In certain embodiments, the data processing module 112 may perform various types of data preprocessing on the input data. For example, in some embodiments, the data processing module 112 may clean, filter, and/or transforms the input data to make it suitable for further analysis. In certain embodiments, this may include, without limitation, removing missing values, scaling and/or normalizing the input data, or converting the input data to a different format. In certain embodiments, the data processing module 112 may utilize natural language processing technology to remove uninformative words (e.g., stop-words).

At step 306, the ticket management system 110 (e.g., the classification/prioritization module 113) classifies each incident within the input data, as described above with respect to FIG. 1. In certain embodiments, the classification/prioritization module 113 classifies each incident of the one or more incidents (e.g., identified from the input data). In certain embodiments, the input data may be categorized using an artificial intelligence ticket categorization model, as discussed above relative to FIG. 1. In various embodiments, the categorization may include, without limitation, grouping similar incidents within the input data and identifying products that are impacted by, and/or associated with the incidents. For example, the impacted products may include, without limitation, business software applications, hardware, operational services, networks, networking devices, and combinations of the same and like. In some embodiments, the input data is categorized based on a business area.

In certain embodiments, the analyzation module 114 analyzes data from a history of incident data and assigns asset relationships based, at least in part, on the analyzing. In such embodiments, the history of incident data relates to the one or more incidents. In some embodiments, the asset relationships may include, for example, various applications and/or services that relate to each other in order for proper operation of a service (e.g., a database server may be related to a web server when both services are required for operation). In this manner, an incident ticket can identify each service that may need to be investigated and/or serviced. In various embodiments, the classification/prioritization module 113 categorizes the input data by receiving historical data associated with the incidents. In some embodiments, the classification/prioritization module 113 may invoke the ticket management system 110 (e.g. the analyzation module 114) to perform pattern discovery using machine learning algorithms. In certain embodiments, the analyzation module 114 generates rules in accordance with similar incidents identified from the history of incident data and the asset relationships and alerts based, at least in part, on the rules the related team to resolve the incident responsive to a related pattern being identified. In certain embodiments, the analyzation module 114 calibrates the incident with an existing pattern responsive to a new pattern being discovered based, at least in part, on a root-cause analysis.

In certain embodiments, the analyzation module 114 performs, in real-time, correlation analysis (e.g., as a part of the classification and/or prioritization) of each incident of the one or more incidents and identifies, in real-time, patterns associated with the correlation analysis. In some embodiments, the patterns include at least one of an issue source, an incident type, or a time-based correlation based on the one or more incidents. In some embodiments, the pattern discovery process includes vectorization of words from the input data using natural language processing. In some embodiments, the analyzation module 114 identifies patterns from vectorized words and the classification/prioritization module 113 classifies the input data using supervised learning algorithms, such as, for example, classification algorithms. In various embodiments, the classified patterns are analyzed via the analyzation module 114 by ranking features of the patterns and reducing the number of factors available in the patterns. In such embodiments, based on the reduced set of factors, anomalies in the patterns may be detected and removed by the analyzation module 114. In certain embodiments, the analyzation module 114 calibrates the incident with an existing pattern responsive to a new pattern being discovered based, at least in part, on a root-cause analysis.

In certain embodiments, the input data (e.g., incident tickets) may by analyzed by the analyzation module 114 to identify sentiments of the incidents by utilizing, for example, text portions of the input data. In certain embodiments, the analyzation module 114 may perform correlation analysis of the incident tickets. In some embodiments, the correlation analysis may be performed in real-time. In some embodiments, the analyzation module 114 may correlate the incident tickets in order to identify patterns in multiple incident tickets. For example, the analyzation module 114 may identify an issue source, an incident type, time-based correlations of incidents, and combinations of the same and like in multiple incident tickets.

At step 308, the ticket management system 110 (e.g., the classification/prioritization module 113) prioritizes and/or escalates an incident, as described above with respect to FIG. 1. In certain embodiments, the classification/prioritization module 113 may prioritize the input data (e.g., incident tickets) before, during, and/or after the input data is classified and/or categorized. In certain embodiments, the prioritization may include prioritizing incident tickets in a queue based on, for example and not by way of limitation, ageing, client requirements, issue type, severity, sentiment, preset rules, and combinations of the same and like. In certain embodiments, incident tickets may be prioritized based on the impact and urgency of the incidents. In various embodiments, the prioritization of incidents includes, without limitation, escalating incidents with high priority and/or incidents which have not been resolved by peers.

In some embodiments, the prioritization of incidents includes escalating incidents with high priority, with identified patterns, incidents which have not been previously resolved by peers, and combinations of the same and like. In certain embodiments, the classification/prioritization module 113 escalates an incident of the one or more incidents (e.g., identified from the input data) based, at least in part, on at least one of the classification of each incident and/or a prioritization level associated with each incident.

At step 310, the ticket management system 110 (e.g., the resolution module 115) generates a resolution, as described with respect to FIG. 1. In various embodiments, the resolution includes at least one of a solution to the incident or an assignment of the incident to a related team. In certain embodiments, a resolution is provided to the incident based on priority and/or categorization. In some embodiments, the resolution module 115 may provide a resolution to the incident by creating a work plan. In some embodiments, the resolution module 115 may provide a resolution by, for example, assigning the incident to relevant teams. In various embodiments, the resolution module 115 provides generating an automated recommendation to resolve the incident. For example, the automated recommendation may include providing one or more recommendations based on previously solved incidents. In some embodiments, a recommendation may be selected by a user and the incident is then assigned to a relevant team with the selected recommendation to resolve the incident.

In some embodiments, the resolution module 115 generates the resolution for the incident by, for example, automatically generating one or more recommendations based, at least in part, on the incident and the solution to the incident, selecting a recommendation from the one or more recommendations, and assigning the incident with the recommendation to the related team. In certain embodiments, the solution is based, at least in part, on an optimal-path mapping to the resolution based, at least in part, on an incident type of the incident.

While method 300 is described with various modules performing sequential steps, it is to be understood that any component within the system 100 may perform any of the foregoing steps in various sequences, in tandem, and/or in parallel, and may be performed in real-time and/or at specific time intervals (e.g., every 5, 10, 15, 20, 30, 45, or 60 minutes). In certain embodiments, various steps within the method 300 may be omitted. Additionally, method 300 may be performed for a single incident ticket or for a plurality of incident tickets, and each step and/or process can be performed as outlined above with respect to FIG. 1. Permutations of method 300 are readily envisioned without deviating from the scope of the disclosure. For example, various steps within method 300 may be omitted, combined with other steps, or have additional steps added without deviating from the scope of the disclosure.

In certain embodiments, implementing the ticket management system 110 of the disclosure benefits IT support teams in many aspects, for example, by providing detailed insight for root-cause analysis, resolution categorization, time service analysis, increased system availability, automated alerts to support team, focused IT support analysis, reduced turnaround for support tickets, and effective SLA management.

Although various embodiments of the present disclosure have been illustrated in the accompanying Drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially", "approximately", "generally", and "about" may be substituted with "within [a percentage] of" what is specified, where the percentage includes 0.1, 1, 5, and 10 percent.

The foregoing outlines features of several embodiments so that those of ordinary skill in the art may better understand the aspects of the disclosure. Those of ordinary skill in the art should appreciate that they may readily use the disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a", "an", and other singular terms are intended to include the plural forms thereof unless specifically excluded.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can", "might", "may", "e.g.", and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments or that one or more embodiments necessarily include logic for deciding, with or without author input or prompting, whether these features, elements, and/or states are included or are to be performed in any particular embodiment.

While the above detailed description has shown, described, and pointed out novel features as applied to various embodiments, it will be understood that various omissions, substitutions, and changes in the form and details of the embodiments illustrated can be made without departing from the spirit of the disclosure. As will be recognized, the various embodiments described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method for incident ticket management, comprising, by a computer system:

receiving input data comprising information relating to a plurality of incidents;

classifying the plurality of incidents at least based on natural language processing of the input data, the classifying yielding one or more information technology (IT) products impacted by the plurality of incidents;

correlating the classified plurality of incidents to identify at least one pattern in the classified plurality of incidents, wherein the at least one pattern is identified based on the one or more IT products, incident type, and time, wherein the at least one pattern relates to two or more incidents of the plurality of incidents, and wherein at least one IT product of the one or more IT products is impacted by the two or more incidents;

analyzing historical incident data to identify one or more similar historical incidents based on the at least one pattern;

assigning asset relationships for the two or more incidents based on the at least one IT product and the one or more similar historical incidents, wherein the asset relationships relate together one or more applications and/or one or more services associated with providing the at least one IT product;

generating a routing rule based on the assigned asset relationships and the one or more similar historical incidents, the routing rule identifying a resolution team for the two or more incidents;

generating a resolution for the two or more incidents, the resolution comprising a solution to the two or more incidents, the generating the resolution comprising:

automatically generating one or more recommendations based, at least in part, on the two or more incidents and the solution to the two or more incidents;

selecting a recommendation from the one or more recommendations; and assigning the two or more incidents with the recommendation to the identified resolution team;

escalating the two or more incidents based, at least in part, on at least one of the classifying or a prioritization level associated with one or more of the two or more incidents; and alerting, based on the routing rule and the escalating, the identified resolution team to resolve the two or more incidents.

2. The method of claim 1, wherein the solution is based, at least in part, on an optimal-path mapping to the resolution based, at least in part, on an incident type of at least one of the two or more incidents.

3. The method of claim 1, wherein the at least one pattern is identified further based on an issue source.

4. The method of claim 1, wherein the correlating comprises vectorizing words of the input data using natural language processing, and wherein the at least one pattern is identified at least partly based on the vectorized words.

5. The method of claim 1, wherein the routing rule specifies that a first level of support be bypassed for a second level of support.

6. The method of claim 1, further comprising calibrating the two or more incidents with an existing pattern responsive to a new pattern being discovered based, at least in part, on a root-cause analysis.

7. A system for incident ticket management, comprising:

memory; and at least one processor coupled to the memory and configured to implement a method, the method comprising:

receiving input data comprising information relating to a plurality of incidents;

classifying the plurality of incidents at least based on natural language processing of the input data, the classifying yielding one or more information technology (IT) products impacted by the plurality of incidents;

correlating the classified plurality of incidents to identify at least one pattern in the classified plurality of incidents, wherein the at least one pattern is identified based on the one or more IT products, incident type, and time, wherein the at least one pattern relates to two or more incidents of the plurality of incidents, and wherein at least one IT product of the one or more IT products is impacted by the two or more incidents;

analyzing historical incident data to identify one or more similar historical incidents based on the at least one pattern;

assigning asset relationships for the two or more incidents based on the at least one IT product and the one or more similar historical incidents, wherein the asset relationships relate together one or more applications and/or one or more services associated with providing the at least one IT product;

generating a routing rule based on the assigned asset relationships and the one or more similar historical incidents, the routing rule identifying a resolution team for the two or more incidents;

generating a resolution for the two or more incidents, the resolution comprising a solution to the two or more incidents, the generating the resolution comprising:

automatically generating one or more recommendations based, at least in part, on the two or more incidents and the solution to the two or more incidents;

selecting a recommendation from the one or more recommendations; and assigning the two or more incidents with the recommendation to the identified resolution team;

escalating the two or more incidents based, at least in part, on at least one of the classifying or a prioritization level associated with one or more of the two or more incidents; and alerting, based on the routing rule and the escalating, the identified resolution team to resolve the two or more incidents.

8. The system of claim 7, wherein the solution is based, at least in part, on an optimal-path mapping to the resolution based, at least in part, on an incident type of at least one of the two or more incidents.

9. The system of claim 7, wherein the at least one pattern is identified further based on an issue source.

10. The system of claim 7, wherein the correlating comprises vectorizing words of the input data using natural language processing, and wherein the at least one pattern is identified at least partly based on the vectorized words.

11. The system of claim 7, wherein the routing rule specifies that a first level of support be bypassed for a second level of support.

12. The system of claim 7, wherein the method comprises calibrating the two or more incidents with an existing pattern responsive to a new pattern being discovered based, at least in part, on a root-cause analysis.

13. A computer-program product comprising a non-transitory computer-usable medium having computer-readable program code embodied therein, the computer-readable program code adapted to be executed to implement a method for incident ticket management comprising:

receiving input data comprising information relating to a plurality of incidents;

classifying the plurality of incidents at least based on natural language processing of the input data, the classifying yielding one or more information technology (IT) products impacted by the plurality of incidents;

correlating the classified plurality of incidents to identify at least one pattern in the classified plurality of incidents, wherein the at least one pattern is identified based on the one or more IT products, incident type, and time, wherein the at least one pattern relates to two or more incidents of the plurality of incidents, and wherein at least one IT product of the one or more IT products is impacted by the two or more incidents;

analyzing historical incident data to identify one or more similar historical incidents based on the at least one pattern;

assigning asset relationships for the two or more incidents based on the at least one IT product and the one or more similar historical incidents, wherein the asset relationships relate together one or more applications and/or one or more services associated with providing the at least one IT product;

generating a routing rule based on the assigned asset relationships and the one or more similar historical incidents, the routing rule identifying a resolution team for the two or more incidents;

generating a resolution for the two or more incidents, the resolution comprising a solution to the two or more incidents, the generating the resolution comprising:

automatically generating one or more recommendations based, at least in part, on the two or more incidents and the solution to the two or more incidents;

selecting a recommendation from the one or more recommendations; and assigning the two or more incidents with the recommendation to the identified resolution team;

escalating the two or more incidents based, at least in part, on at least one of the classifying or a prioritization level associated with one or more of the two or more incidents; and alerting, based on the routing rule and the escalating, the identified resolution team to resolve the two or more incidents.

14. The computer-program product of claim 13, wherein the solution is based, at least in part, on an optimal-path mapping to the resolution based, at least in part, on an incident type of at least one of the two or more incidents.

* * * * *